(12) United States Patent
Bansal et al.

(10) Patent No.: US 12,096,505 B2
(45) Date of Patent: *Sep. 17, 2024

(54) INTELLIGENT CELLULAR CHANNEL MANAGEMENT

(71) Applicant: DISH Wireless L.L.C., Littleton, CO (US)

(72) Inventors: Ashish Bansal, Frisco, TX (US); Siddhartha Chenumolu, Ashburn, VA (US); Mehdi Alasti, Arlington, VA (US); Paul-André Raymond, Reston, VA (US); Kazi Bashir, Lewisville, TX (US); David Zufall, Lone Tree, CO (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,100

(22) Filed: Nov. 22, 2022

(65) Prior Publication Data

US 2023/0079241 A1 Mar. 16, 2023

Related U.S. Application Data

(63) Continuation of application No. 17/181,815, filed on Feb. 22, 2021, now Pat. No. 11,553,548.

(51) Int. Cl.
*H04W 4/14* (2009.01)
*H04W 72/0453* (2023.01)
(Continued)

(52) U.S. Cl.
CPC ............ *H04W 76/25* (2018.02); *H04W 4/14* (2013.01); *H04W 72/0453* (2013.01); *H04W 76/38* (2018.02)

(58) Field of Classification Search
CPC ... H04W 4/14; H04W 72/0453; H04W 76/25; H04W 76/38
See application file for complete search history.

(56) References Cited

U.S. PATENT DOCUMENTS 8,331,912 B1   12/2012   Lundy et al.
8,670,425 B1 *  3/2014   Xue ...................... H04W 4/029
                                                 370/329

(Continued)

OTHER PUBLICATIONS

International Search Report and Written Opinion for PCT/US2022/016419 mailed May 25, 2022, all pages.

*Primary Examiner* — Mansour Oveissi
(74) *Attorney, Agent, or Firm* — Kilpatrick Townsend & Stockton LLP

(57) ABSTRACT

Various arrangements for performing intelligent cellular channel management are presented herein. A physical cellular communication channel may be established between a user equipment (UE) and a cellular network for sending a short message service (SMS) message in response to a cellular service request from the UE. One or more characteristics of the UE, the SMS message, or both may be analyzed. A duration of time for which the physical cellular communication channel is to be kept active may be based on the analyzed one or more characteristics. A channel maintenance instruction may be transmitted to keep the physical cellular communication channel active based on a cellular network messaging controller determining to adjust the duration of time for which the physical cellular communication channel is kept active.

18 Claims, 4 Drawing Sheets

(51) Int. Cl.
    *H04W 76/25*    (2018.01)
    *H04W 76/38*    (2018.01)

(56) References Cited

U.S. PATENT DOCUMENTS

| | | |
|---|---|---|
| 2007/0049276 A1 | 3/2007 | Rimoni et al. |
| 2011/0263259 A1* | 10/2011 | Yamagishi ........ H04W 36/0079 |
| | | 455/436 |
| 2015/0348329 A1* | 12/2015 | Carre ............... H04N 21/42202 |
| | | 345/633 |
| 2016/0105781 A1* | 4/2016 | Wells ................. H04M 7/0024 |
| | | 455/466 |
| 2019/0182665 A1 | 6/2019 | Edge |
| 2019/0289042 A1 | 9/2019 | Perreault et al. |
| 2020/0204962 A1 | 6/2020 | Hua et al. |
| 2021/0266813 A1 | 8/2021 | Papa et al. |
| 2021/0368425 A1* | 11/2021 | Bao ....................... H04W 48/16 |
| 2022/0043703 A1* | 2/2022 | Hwang ................. G06T 11/206 |
| 2022/0113690 A1* | 4/2022 | Seifert ................... G06Q 50/06 |

* cited by examiner

INTELLIGENT CELLULAR CHANNEL MANAGEMENT

CROSS-REFERENCE TO RELATED APPLICATION

This application is a continuation of U.S. patent application Ser. No. 17/181,815 filed Feb. 22, 2021, entitled "INTELLIGENT CELLULAR CHANNEL MANAGEMENT," the entire disclosure of which is hereby incorporated by reference, for all purposes, as if fully set forth herein.

BACKGROUND

For data to be exchanged between a user equipment (UE) and a cellular network, a communication channel needs to be established between the UE and cellular core network. Establishment of this communication channel involves processing and signaling overhead. Once the channel is established, the channel may be maintained for a period of time based on a timer. If additional data needs to be exchanged between the UE and the cellular network before the timer expires, the channel can be reused. However, if additional data needs to be exchanged between the UE and the cellular network after the timer expires, a new channel may need to be created, which involves the requisite overhead, since the previous channel would have been "torn down," set to idle, or closed on expiration of the timer.

SUMMARY

Various embodiments are described related to a cellular network system that performs intelligent cellular channel management. In some embodiments, a cellular network system that performs intelligent cellular channel management is described. The system may comprise a cellular core network. The system may include a short message service center (SMSC) functioning as part of the cellular core network. The system may include a cellular base station in communication with the cellular core network. The cellular base station (BS) may communicate wirelessly using a cellular radio access technology (RAT) with user equipment (UE). The cellular BS may be configured to establish a physical cellular communication channel between the UE and a centralized unit (CU) of the cellular network system for sending a short message service (SMS) message via the SMSC in response to a cellular service request from the UE. The system may comprise a cellular network messaging controller in communication with the CU. The cellular network messaging controller may be configured to analyze one or more characteristics of use of the UE. The cellular network messaging controller may be configured to determine a duration of time for which the physical cellular communication channel may be kept active based on the analyzed one or more characteristics of use of the UE. The cellular network messaging controller may be configured to transmit a channel maintenance instruction to the CU to keep the physical cellular communication channel active based on the cellular network messaging controller determining to adjust the duration of time for which the physical cellular communication channel may be kept active. In response to the channel maintenance instruction, the physical cellular communication channel may be kept active.

Embodiments of such a system may include one or more of the following features: the UE may be configured to transmit the SMS message via the physical cellular communication channel. The UE may be configured to send the one or more characteristics of use of the UE to the cellular BS. The UE may be configured to transmit a first characteristic indicating that an SMS messaging application may be open on the UE. The UE may be configured to transmit a second characteristic indicating that a user may be typing on the UE. The SMSC may be configured to receive the SMS message sent by the UE via the physical cellular communication channel and cause the SMS message to a destination. The physical cellular communication channel, while active, may comprise radio resources being reserved for use between the cellular BS and the UE. The channel maintenance instruction may cause the cellular core network to increase a duration of a channel timer. When the channel timer expires, the physical cellular communication channel may be set to idle. The cellular core network may set the physical cellular communication channel to idle after receiving the channel maintenance instruction. The cellular network messaging controller may perform a machine learning process to analyze the one or more characteristics of use of the UE. The one or more characteristics of use of the UE may be characteristics of an SMS message sent by the UE. The machine learning process may comprise analyzing at least one characteristic selected from the group consisting of: a length of the SMS message; a time at which the SMS message was transmitted; a location of the UE from which the SMS message was transmitted; and SMS code. The cellular core network may be native 5G New Radio (NR) and the cellular base station may be a gNodeB.

In some embodiments, a method for performing intelligent cellular channel management is described. The method may comprise establishing a physical cellular communication channel between a user equipment (UE) and a centralized unit (CU) of a cellular network for sending a short message service (SMS) message in response to a cellular service request from the UE. The method may comprise analyzing one or more characteristics of the UE, the SMS message, or both. The method may comprise determining a duration of time for which the physical cellular communication channel may be kept active based on the analyzed one or more characteristics. The method may comprise transmitting a channel maintenance instruction to the CU to keep the physical cellular communication channel active based on the cellular network messaging controller determining to adjust the duration of time for which the physical cellular communication channel may be kept active. In response to the channel maintenance instruction, the CU may keep the physical cellular communication channel active. The method may further comprise transmitting, by the UE, the SMS message via the physical cellular communication channel. The method may further sending, by the UE, a characteristic of use of the UE to the cellular BS. The characteristic may indicate that an SMS messaging application may be open on the UE. The method may further comprise transmitting, by the UE, a second characteristic indicating that a user may be inputting text to the UE. The method may further comprise receiving, by an SMSC of the cellular network, the SMS message sent by the UE via the physical cellular communication channel. The method may further comprise causing the SMS message to be routed to a destination. The physical cellular communication channel, while active, may comprise radio resources being reserved for use between the cellular BS and the UE. The method may further comprise increasing, by the CU, a duration of a channel timer in response to the channel maintenance instruction. When the channel timer expires, the physical cellular communication channel may be set to idle. The method may further comprise setting, by the CU, the physical cellular communication channel to idle based on the channel maintenance instruction.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments detailed herein cause the duration of a channel established for communication between a UE and a base station (BS) to be intelligently varied based on characteristics of a transmitted message, monitored characteristics of the UE, or both. Rather than a timer that uses a fixed duration of time (e.g., for all users of a cellular network) be used to determine when the channel should be set to idle due to inactivity, either the duration of the channel is varied by a network messaging controller system (NMCS) or the channel is maintained open until the NMCS determines that the channel should be idled.

The NMCS may monitor characteristics of the UE, network characteristics, RF characteristics, and/or a message sent by (or to) the UE. Based on the rules, the NMCS may apply various rules that determines an amount of time for which a timer may be set to keep the channel open. After the timer has begun elapsing, the duration of the timer may be adjusted based on characteristics of the UE. In other embodiments, no timer may be present. Rather the NMCS may analyze characteristics, apply rules (or a machine-learning model), and either set/adjust a timer that controls the channel's state or send a command that controls the communication channel's state (e.g., whether it is set to idle).

In some embodiments, rather than applying a set of rules, an artificial intelligence (AI) arrangement is incorporated as part of the NMCS. For example, the NMCS may employ machine learning to determine how long a channel should be maintained open for a possible future message to be transmitted using the same channel. A machine learning model may be trained based on characteristics of the initially-transmitted message, characteristics of the UE, or both.

Whether rules-based, machine learning-based, or a hybrid arrangement, such implementations can allow for lower latency communications between a UE and a cellular network due to fewer messages needed to be queued pending paging or communication channel setup. Such implementations can allow for more efficient radio optimization since the scheduling and radio channel resources are managed using high level data, such as user behavior and application state data. Further, UE battery life can be improved due to decreased signaling since the state of the communication channel is more efficiently managed.

Figure 1:
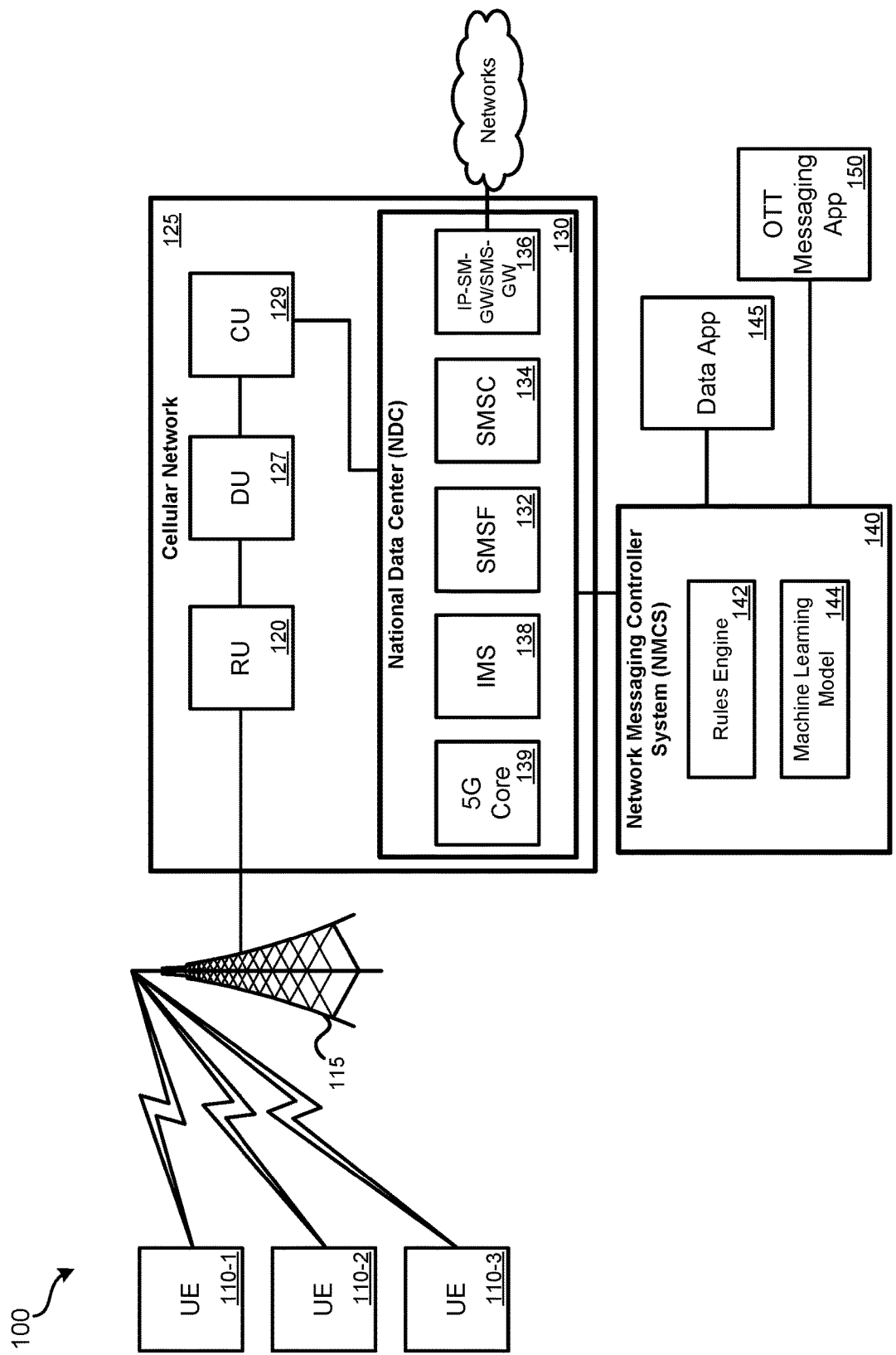
FIG. 1 illustrates an embodiment of a cellular network system that performs intelligent cellular channel management.

Further detail regarding such embodiments and additional embodiments are presented in relation to the figures. FIG. 1 illustrates an embodiment of a cellular network system 100 that performs intelligent cellular channel management. Cellular network system 100 can include: UE 110 (UE 110-1, UE 110-2, UE 110-3); base station 115; radio unit (RU) 120; cellular network 125, which can include distributed unit (DU) 127, centralized unit (CU) 129, and national data center (NDC) 130; NMCS 140; data application 145; and Over-the-top (OTT) messaging app 150.

UE 110 can represent various forms of devices that communicate via a cellular network. UE 110 can include smartphones; cellular phones; cellular modems; cellular access points (APs); Internet of Things (IoT) devices; fixed wireless devices; etc. As illustrated, three pieces of UE 110 are illustrated. This number of UE are for example purposes only. UE and the cellular network may function according to one or more radio access technologies (RAT). For example, UE and base station 115 may communicate according to 5G New Radio (NR) cellular communication protocol. Other RATs are possible, such as 4G Long Term Evolution (LTE), GSM, 3G, etc. RATs yet to be developed or deployed, such as 6G, may also be possible.

UE 110 communicate with base station 115. For a 5G NR cellular network, the terms base station and gNodeB may be used interchangeably. Base station 115 may include one or more antennas and RU 120. RU 120 serves as the interface between wireless communications and cellular network 125. Cellular network 125 may be native 5G NR. In other embodiments, cellular network 125 may function according to some other standard. Cellular network 125 may be implemented in accordance with open radio access network (O-RAN) standards such that the functionality of components within cellular network 125 are wholly or largely implemented using general-purpose computer servers that execute specialized firmware or software.

Cellular network 125 can include DU 127, CU 129, one or more regional data centers (not pictured), and NDC 130. Only a single instance of RU 120, DU 127, and CU 129 are illustrated for simplicity; a real-world implementation of a cellular network can involve many similar components being implemented over large geographic regions. On a 5G NR-based network, a gNodeB (gNB) includes one or more RUs, one or more DUs and a CU. In different system architectures, specific functions may be assigned to either the DU or the CU. NDC 130 can perform functions specific to messaging, such as short message service (SMS) messaging. Embodiments detailed within this document are focused on SMS messaging; however, the principles applied to determining whether a communication channel should be maintained is open for SMS messaging can also be applied to determining whether communication channel should be maintained is open for other forms of communication between a UE and RU 120.

NDC 130 can perform the functions of short message service function (SMSF) 132, short message service center (SMSC) 134, Internet Protocol-Short Message-Gateway (IP-SM-GW)/short message service gateway (SMS-GW) 136 (hereinafter "GW 136"); IP Multimedia Subsystem (IMS) 138; and 5G C. SMSF 132 may perform functions including analyzing a subscription or permissions associated with the source and/or destination of an SMS text. SMSF 132 may only permit the SMS to be completed if in accordance with the subscription or permissions allocated to the transmitting and/or receiving UE. SMSF 132 may serve to forward permitted SMS messages to SMSC 134. GW 136 may facilitate SMS transmissions between cellular network providers and with other forms of networks (e.g., transmission of an SMS message from a computer system that uses the Internet to communicate with GW 136. SMSC 134 may serve to store, forward, convert, and deliver SMS messages for the cellular network. IMS 138 allows for SMS messages to be delivered via IP. IMS 138 routes SMS messages through the user plane and uses IMS to send the SMS to SMSC 134. Regardless of whether an SMS is routed via IMS 138 or via the control plane and SMSF 132, the embodiments presented in this document are applicable.

5G Core 139 can perform a variety of functions. 5G Core 139 can include: authentication server function (AUSF); core access and mobility management function (AMF); data network (DN) which can provide access to various other networks; structured data storage network function (SDSF); and unstructured data storage network function (UDSF).

When an SMS message is to be transmitted from a UE, such as UE 110-1, to SMSC 134 or IMS 138, or from SMSC 134 or IMS 138 to UE 110-1, a communication channel is created between UE 110-1 and CU 129 on the control plane or the user plane, respectively. A communication channel can involve radio resources such as particular frequencies and/or time periods, being reserved for communication between UE 110-1 and CU 129. In a cellular communication protocol stack, a communication channel can represent the physical layer of the stack and involves reservation of time and/or frequency resources for wireless communication between the UE and the RU. Establishment of the communication channel involves an amount of signaling occurring between UE 110-1, RU 120, DU 127, and/or CU 129. More specifically, this communication channel can be in the form of a radio resource control (RRC) connection being established between UE 110-1 and the cellular network's gNB (the DU and CU). An RRC connection can exist in several modes, including an idle mode (no connection present); dedicated channel; forward access channel (from UE to gNB); cell paging channel; and URA paging channel. Each of these states involves a different amount of signaling between the UE and the gNB, an amount of communication/processing resources being used by the gNB, RU, and UE, and differing amounts of power consumption by the UE. Information about the establishment, state, and closing of communication channels may occur over the non-access stratum (NAS), which is a functional layer in the cellular wireless protocol stack that exists between UE and the gNB.

When a communication channel is active (i.e., any mode other than idle) between UE 110-1 and a gNB, multiple timers may be maintained by the gNB to determine the state in which the communication channel should be maintained. For example, a first timer (T1) may determine when a transition from a dedicated channel to a forward access channel is to occur; a second timer (T2) can control when transition from a forward access channel to a paging channel is to occur; and a third timer (T3) can control when transition from the paging channel to idle is to occur. The duration of these timers may be set by the network operator. Conventionally, the timers are static for all UE. If the communication channel is utilized while the timer is active, the time may be reset. If the timer expires before the communication channel is utilized again, the transition can occur.

Cellular network system 100 includes NMCS 140, which can be in communication with NDC 130 or directly in communication with one or more gNB components, such as DU 127 and/or CU 129. NMCS 140 can control the state of a communication channel between a UE and a gNB by sending the gNB a channel maintenance instruction. NMCS 140 uses channel maintenance instructions to set or modify the duration of timers, such as timer T300, or can replace or supersede such timers by making transitions on a communication channel dependent on commands being sent to the gNB from NMCS 140.

NMCS 140 may make decisions on the duration of a communication channel timer or the state in which a communication channel should be maintained based on multiple sources of information. A first source of information can be characteristics transmitted by the UE to the gNB, which may be forwarded by cellular network 125 to NMCS 140. Details on such characteristics are provided in relation to FIG. 2. Additionally or alternatively, NMCS may make decisions on the duration of a communication channel timer or the state in which a communication channel should be maintained based on characteristics of the SMS message itself. The gNB, which can include DU 127 and CU 129, or SMSC 134 may send the SMS message itself to NMCS 140 or may send characteristics of the SMS message to NMCS 140 for analysis. Such characteristics can include: a time at which the SMS was sent; a date on which the SMS message was sent; a geographic location from where the SMS message was sent; an identity of the source of the SMS message; an identity of the recipient of the SMS message; a geographic location of where the recipient is located; an application that sent the SMS message; a length of the SMS message; a particular string of characters present within the SMS message; a type or class of UE from which the SMS message originated; a cellular network slice used by the sender; a cellular network slice used by the recipient; number of SMS messages sent by UE within a defined time period; and/or an SMS code used (e.g., GSM code, USC2 code).

In addition or in alternate to characteristics of the SMS message and the UE, NMCS 140 may analyze characteristics of the cellular network. NMCS 140 may receive characteristics of an amount of utilization of radio resources between RU 120 and UE 110. NMCS 140 may receive other network information such as an amount of utilization of processing or communication resources of particular components of cellular network 125. Characteristics analyzed can additionally or alternatively include: RF conditions of the UE, power consumption of the UE (e.g., power consumption of the UE is lower when the signal sent to the gNB is lower power); network load, SINR, interference conditions, time of day, day of week, etc.

NMCS 140 may function in various ways. In some embodiments, NMCS 140 has various rules that are followed based on characteristics of the UE, characteristics of the SMS message, and/or characteristics of the cellular network. These rules may be used to set or update a duration of a timer such as a T300-class timer. Alternatively, these rules may be used to send a command to the gNB indicating that a communication channel should be maintained in a particular active state or should be set to idle. Table 1 indicates examples of possible rules that may be used to adjust the duration of a timer.

TABLE 1

| Characteristic | Adjustment to Timer/Command |
| --- | --- |
| SMS Message is greater than 150 characters | Default timer plus 25 s |
| SMS sent by IoT-class device | Default timer minus 10 s |
| UE has SMS App active | Default timer plus 20 s |
| UE has SMS App active plus receiving text | Keep channel active (i.e. non-idle) |
| SMS sent by particular UE | Set channel to idle mode |
| Greater than 5 SMS messages sent in a defined time period by UE | Default plus 30 s |

In some embodiments, rather than using defined rules, an AI-based approach may be used by NMCS 140, such as using machine learning model 144. Machine learning may involve training a machine learning model 144 to determine durations of timers that should be used and/or when commands to switch the state of a communication channel to idle should be sent. A set of training data can include characteristics on a large number of SMS messages and UE that sent/received should SMS messages, along with data about when the UE next needed the communication channel available. For example, one possible machine learning implementation can involve a neural network being trained based on some or all of these characteristics. These characteristics can serve as input features to the neural network. The neural network may then perform a classification based on the features to select a predefined timer duration or time duration class. In other embodiments, other forms of machine learning may be used to calculate a particular amount of time that may be used to set the timer and/or determine when a command to change the state of the communication channel should be sent.

In some embodiments, NMCS 140 may modify a previously-set timer. For instance, based on characteristics of the UE that have changed, changing the duration of the timer may be efficient. For example, if a timer is set to expire and will result in the communication channel being set to idle, but NMCS 140 receives characteristic information about the UE indicating that a user has opened an SMS application, NMCS 140 may increase the duration of the timer. Similarly, if a timer is not set to expire for some amount of time, but the NMCS 140 receives characteristics information about the UE indicating that a user has closed the SMS application, NMCS 140 may decrease the duration of the timer or may send a command to the gNB indicating that the communication channel be set to idle. Such modification can be managed by NMCS 140 using rules or a machine learning model.

In some embodiments, in addition or in alternate to using characteristics of the UE and/or the SMS message, data may be obtained from one or more other sources. For example, a separate data application 145 may provide information to NMCS 140 that can be used to determine the state which the communication channel should be set to (or how a timer should be adjusted). As an example, a system that receives data from a streaming video camera may determine that a user has placed his UE down and walked away, thus it is unlikely he will be sending an SMS text message in the near future. As another example, OTT messaging application 150 may be a third-party messaging application that may provide data about whether another SMS message is likely to be sent. For instance, OTT messaging application 150 may provide information to NMCS 140 indicating that OTT messaging application 150 intends on sending an SMS within a particular time period or that OTT messaging application 150 expects the UE to respond within a particular time period. This information can be used by NMCS 140 to determine the duration of a timer or a particular state to which the communication channel should be set.

Figure 2:
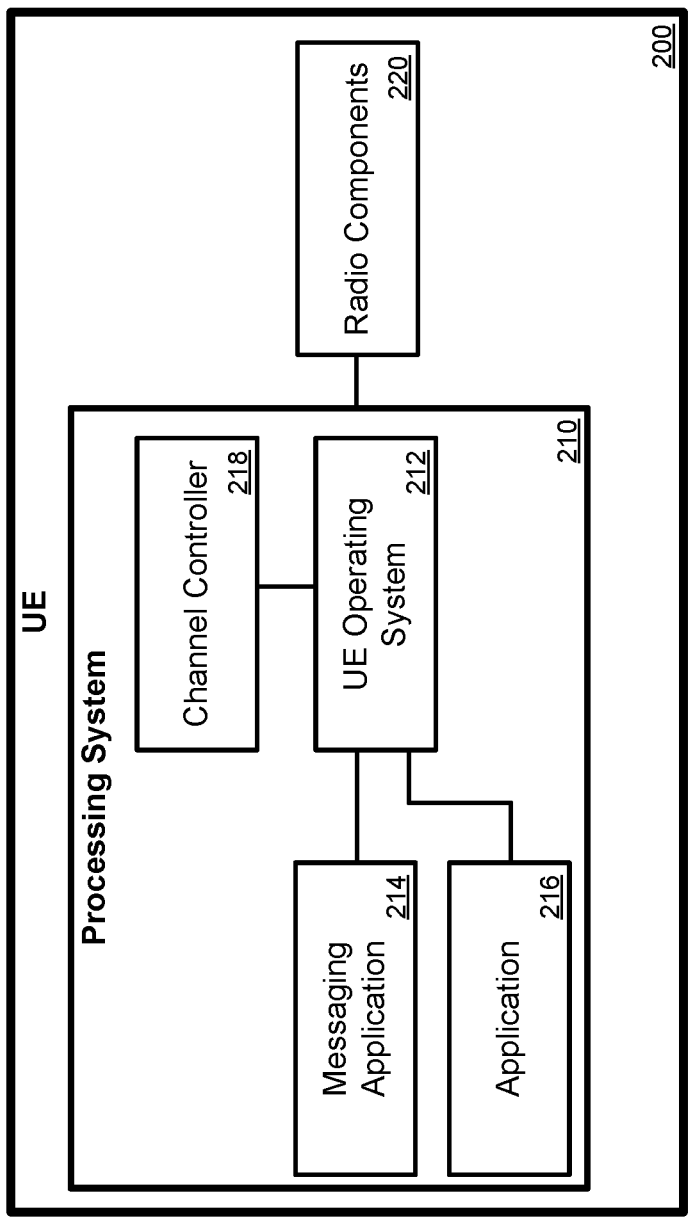
FIG. 2 illustrates an embodiment of user equipment that functions as part of a cellular network system that performs intelligent cellular channel management.

FIG. 2 illustrates an embodiment of UE 200 that functions as part of a cellular network system that performs intelligent cellular channel management. UE 200 can function as, for example, UE 110-1, UE 110-2, UE, 110-3, etc. UE 200 can include processing system 210 and radio components 220. Radio components 220 can enable UE 200 to communicate via one or more RATs, such as 5G NR and 4G LTE. Radio components 220 may exchange data with processing system 210.

Processing system 210 can include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). Processing system 210 can perform the functions of UE operating system (OS) 212, messaging application 214; application 216; and channel controller 218 whether in the form of firmware, software, or special-purpose hardware.

In addition to executing UE OS 212, a messaging application 214 may be executed by processing system 210. Messaging application 214 may be used to send and receive SMS text messages. Other forms of messages may also be sent or received via messaging application 214, such as multimedia messaging service (MMS) messages. Channel controller 218 may be executed by processing system 210. Channel controller 218 may be a background process with which a user does not directly interact. Rather, channel controller 218 may monitor characteristics of UE 200 based on actions being taken by messaging application 214, application 216, and/or how the user is interacting with UE 200. Channel controller 218 may periodically or occasionally cause characteristics of the UE to be transmitted to NMCS 140. Such characteristics can include: whether the user is typing on the UE (or providing voice input); whether, how fast, and the direction that the UE is moving; an orientation of the UE; which application is currently active; a state of the application (e.g., performing an SMS-based authentication process); whether an SMS application is active; whether audio/video is being output by the UE; and whether the UE is locked. The characteristics of the UE may be sent while a channel is already open, may be predicted, and/or may be sent via an alternative path, such as via a packet connection, to the cellular network.

Indications of such characteristics can be transmitted occasionally to the cellular network and forwarded to NMCS 140. NMCS 140 can use this data to set a timer for when the state of the channel should be changed, such as to idle, or can be used to determine when a command should be sent to the gNB to change state.

Figure 3:
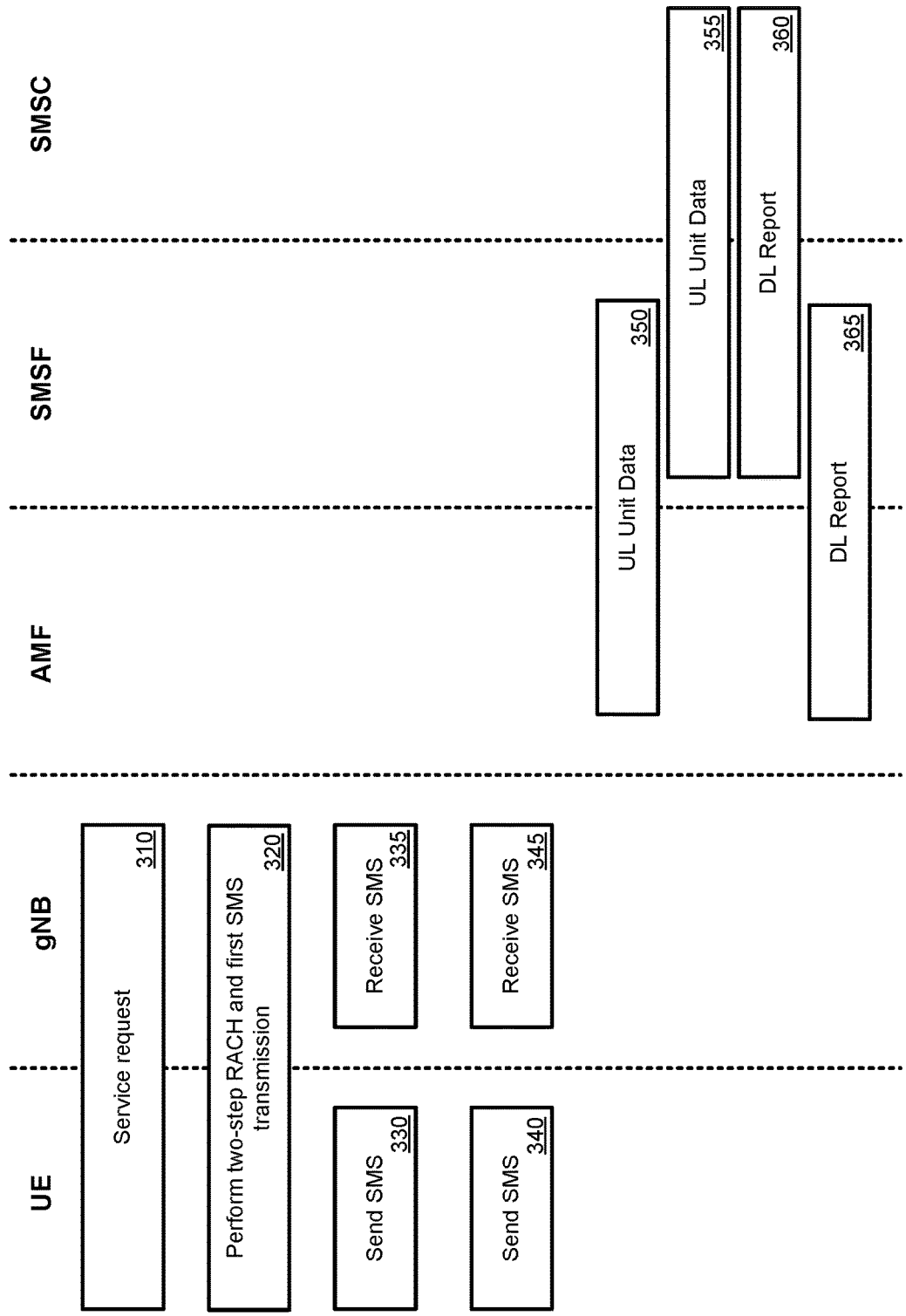
FIG. 3 illustrates a swim diagram of communication between UE and a cellular core network of a cellular network system that perform intelligent cellular channel management.

FIG. 3 illustrates a swim diagram of communication between UE and a cellular core network of a cellular network system that perform intelligent cellular channel management. In FIG. 3, interactions between a UE, gNB, AMF (5G Core Access and Mobility Function), SMSF, and SMSC are illustrated. AMF can be understood as a function performed by NDC 130 of cellular network 125. The AMF receives connection and session related information from the UE and can be responsible for handling connection and mobility management-related tasks.

Service request 310 occurs when the UE has a SMS message that is to be sent to the cellular network. At the time of the service request being present at the UE, the UE may have its communication channel in idle mode. To establish a communication channel from idle mode, a two-step RACH (random access channel) process 320 (or some other process, such as in 3G) may be initiated by the UE. RACH is a shared channel that is used by multiple UE to perform an unscheduled communication with a gNB. The physical-layer channel used for RACH is referred to as PRACH. In a two-step RACH, a first transmission is sent from the UE to the gNB that includes a RA (random access) preamble and a message, which may include a first SMS text to be transmitted. In response to a successfully received first transmission, the gNB responds to the UE with a second transmission that includes an RA response and a message. The RA response can include the detected preamble ID from the first transmission, a time-advance command, and an uplink grant for scheduling a future third transmission from the UE to the gNB.

Following the two-step RACH, a communication channel (RRC channel) has been established for the UE, the communication channel is not in idle mode, and the UE has some number of reserved resource blocks (timeslot and frequency) on which to transmit messages to the gNB. At blocks 330 and 340, the UE may use these reserved timeslots while the communication channel is active (i.e., non-idle) to send future SMS messages. Such messages may be received by the gNB and processed at blocks 335 and 345.

At this point, the communication channel between the UE and the gNB is non-idle. The NMCS is performing its analysis based on characteristics of the UE and/or SMS message to determine how a timer should be adjusted at the gNB (or when a command should be sent) to the gNB that would dictate when the communication channel is made idle. Once made idle, the two-step RACH process would need to be repeated.

When an SMS originates from a UE in idle and is sent over NAS, the UE performs domain selection and the UE and network perform a UE-triggered service request procedure to establish a NAS signaling connection to AMF. The UE can build an SMS message to be sent. The SMS message is encapsulated in an NAS message with an indication indicating that the NAS message is for SMS transporting. The UE sends the NAS message to the AMF as part of block 340. The AMF can add information, such as the current UE Location Information, and the local time zone, and can forward the SMS message and the UE identity to the SMSF serving the UE at block 350. The SMSF can send an SMS acknowledgement message to AMF. The AMF forwards the SMS acknowledgement message from the SMSF to the UE using a downlink unit data message. The SMSF can check the SMS management subscription data. The SMSF can forward the SMS message to SMSC at block 355, and then forwards the submit report to AMF which is forwarded to UE via the downlink NAS transport at blocks 360 and 365. When an SMS originates from a UE when in a non-idle mode, no service request process may need to be performed.

When an SMS originates terminates at a UE over NAS and the UE is in idle mode, the SMSC can send the SMS message intended for the UE to the SMSF. The SMSF can check the SMS management subscription data. If SMS delivery is permitted (e.g., in accordance with a subscription mapped to the UE), the SMSF can contacts the AMF, and the AMF can page the UE. The UE can then respond to the page with the service request procedure. The SMSF can forward the SMS message to be sent to the AMF. The AMF can transfer the SMS message to the UE. The UE can acknowledge receipt of the SMS message to the SMSF through the AMF. The AMF can add information including the current UE Location Information and the local time zone. The UE can returns a delivery report. The delivery report may be encapsulated in an NAS message and sent to the AMF which can be forwarded to SMSF. The SMSF can acknowledge receipt of the delivery report to the UE. The AMF encapsulates the SMS message via a NAS message to the UE. If the UE is already in a non-idle mode, the process can remain the same except there may be no need for the AMF to perform paging of the UE and can immediate continue with a message to SMSF to allow the SMSF to send the SMS to the UE.

Figure 4:
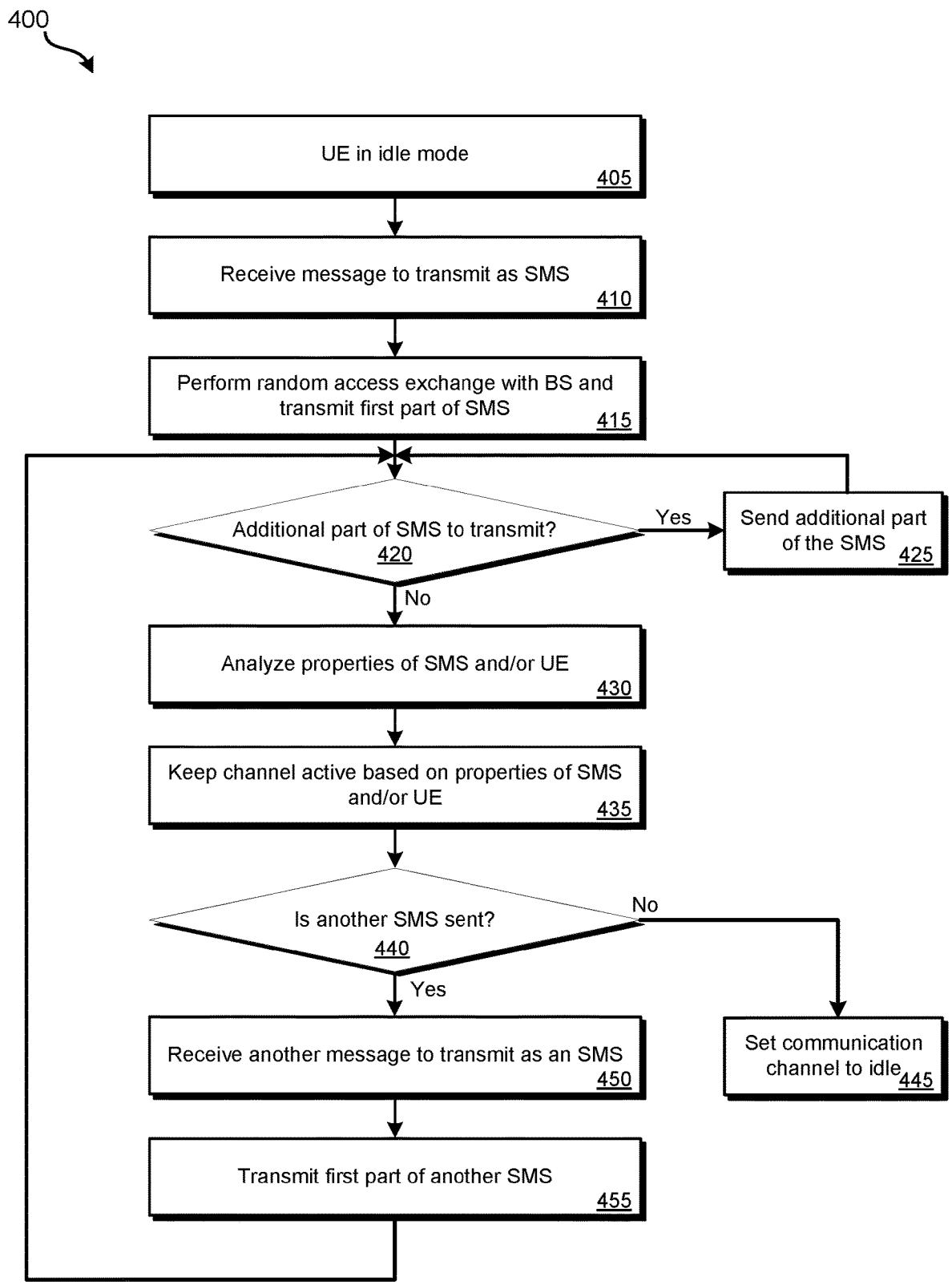
FIG. 4 illustrates an embodiment of a method for performing intelligent cellular channel management.

FIG. 4 illustrates an embodiment of a method 400 for performing intelligent cellular channel management. Method 400 may be performed using the systems and devices detailed in relation to FIGS. 1 and 2. At block 405, a UE may initially not have an active physical-layer communication channel (e.g., RRC communication channel) active with a BS (e.g., gNB). Therefore, in order to transmit data to the BS or, more specifically, gNB, the UE may need to initially communicate using a random-access channel, which can involve some amount of signaling overhead. At block 410, the UE has received data to transmit to the gNB. In method 400, the data that is received is an SMS message from a user. In other embodiments, data other than an SMS message may need to be transmitted. As an example, method 400 may be applied to an MMS message or some other form of data transmission, for example, data exchanged between a cellular network and an IoT device.

In response to receiving a message to transmit, the UE may perform a random access exchange with the BS at block 415. For example, as detailed in relation to FIG. 3, a two-step RACH process may be performed, which can involve a first part of an SMS message being transmitted as part of the RA exchange. This exchange can involve at least one RA message being sent by the UE to the BS and the BS sending a response, which can serve as collision resolution, a confirmation as to the RA message being successfully received, and reserving a communication channel for the UE. In other embodiments, a four-step RACH process or some other form of RA process may be performed.

At block 420, if the SMS is sufficient in length, an additional part of the SMS message may remain pending for transmission. The additional part of the SMS message may be sent at block 425 using the now-active communication channel. Blocks 420 and 425 may repeat until the totality of the SMS message is transmitted.

At block 430, the initial SMS message has been transmitted. One or more properties of the SMS message, UE, or information from a third-party source may be analyzed by an NMCS to determine: an initial value for a timer (e.g., a T300 class timer); an adjustment (increase or decrease) value for the timer; and/or a command to send to the gNB regarding whether the communication channel should be kept active, set to idle, or the particular mode in which the communication channel should be maintained. At block 435, a channel maintenance instruction may be transmitted by the NMCS to the gNB. The channel maintenance instruction may provide the gNB with: a value to use for a timer (e.g., T300 timer); an adjustment to a default value for the timer; or a command to set the communication channel to a particular mode.

Blocks 440, 450, and 455 may occur while the communication channel is still active. If another SMS message is sent at block 450, no RA process needs to be performed because the communication channel involves at least some amount of physical communication resources having been reserved for communication between the UE and the BS. The next SMS message received at block 450 is transmitted at block 455 using the communication channel that was maintained as active by the NMCS. Method 400 may return to block 420, the entirety of the SMS message may be transmitted, and the NMCS may continue to evaluate characteristics of the UE, SMS messages, and other sources of characteristics to determine when the communication channel should be set to idle.

Returning to block 440, if the NMCS determines, based on the characteristics evaluated, that the communication channel should be idled, or sets a T300-class timer to a value that results in the communication channel being set to idle before a next SMS message is transmitted, method 400 may proceed to block 445. At block 445, the communication channel is set to idle. Method 400 now returns to block 405. The UE may remain in idle mode until some future data change is performed between the UE and the BS. When the UE needs to access the cellular network, the UE may now need to repeat the RA process because no physical resources are currently reserved for communication between the UE and BS.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A cellular network system comprising:
   a cellular core network;
   a short message service center (SMSC);
   a cellular base station in communication with the cellular core network, wherein the cellular base station (BS) communicates wirelessly using a cellular radio access technology (RAT) with user equipment (UE), wherein the cellular BS is configured to:
   establish a cellular communication channel between the UE and the cellular core network for sending a short message service (SMS) message via the SMSC; and
   a cellular network messaging controller in communication with the cellular core network, the cellular network messaging controller configured to:
   analyze an SMS message characteristic of the SMS message; and
   determine a duration of time for which the cellular communication channel is to be kept active based on the analyzed SMS message characteristic of the SMS message.

2. The cellular network system of claim 1, wherein the cellular network messaging controller is further configured to:
   transmit a channel maintenance instruction to keep the cellular communication channel active based on the determined duration of time.

3. The cellular network system of claim 2, wherein the cellular base station is configured to receive the transmitted channel maintenance instruction and adjust a timer based on the determined duration of time.

4. The cellular network system of claim 3, wherein the cellular base station is a gNodeB comprising a distributed unit (DU) and a centralized unit (CU).

5. The cellular network system of claim 4, wherein the timer is the T300 timer.

6. The cellular network system of claim 3, wherein when the timer expires, the cellular communication channel is set to idle.

7. The cellular network system of claim 1, further comprising the UE, wherein the UE is configured to transmit a cellular service request in response to the SMS message being ready to be sent.

8. The cellular network system of claim 7, wherein the cellular communication channel is established in response to the cellular base station receiving the cellular service request.

9. The cellular network system of claim 8, further comprising the UE configured to:
   transmit the SMS message via the cellular communication channel; and
   send the one or more characteristics of use of the UE to the cellular BS.

10. The cellular network system of claim 1, wherein the cellular communication channel, while active, comprises radio resources being reserved for use between the cellular BS and the UE.

11. The cellular network system of claim 1, wherein the cellular network messaging controller is configured to apply a machine learning model to analyze the one or more characteristics of use of the UE.

12. The cellular network system of claim 1, wherein the SMS message characteristic of the SMS message is selected from the group consisting of:
- a number of characters in the SMS message;
- a time or date at which the SMS message was sent;
- an identity of a recipient of the SMS message;
- a string of characters within the SMS message; and
- a number of SMS messages sent by the UE in a defined time period.

13. A cellular network system comprising:
a cellular core network;
a short message service center (SMSC);
a cellular base station in communication with the cellular core network, wherein the cellular base station (BS) communicates wirelessly using a cellular radio access technology (RAT) with user equipment (UE), wherein the cellular BS is configured to:
    establish a cellular communication channel between the UE and the cellular core network for sending a short message service (SMS) message via the SMSC; and
a cellular network messaging controller in communication with the cellular core network, the cellular network messaging controller configured to:
    analyze an SMS message characteristic of the SMS message by apply a machine learning model to analyze the SMS message characteristic, wherein the machine learning model analyzes at least one characteristic selected from the group consisting of:
        a number of characters in the SMS message;
        a time or date at which the SMS message was sent;
        an identity of a recipient of the SMS message;
        a string of characters within the SMS message; and
        a number of SMS messages sent by the UE in a defined time period; and
    determine a duration of time for which the cellular communication channel is to be kept active based on the analyzed SMS message characteristic.

14. A method comprising:
establishing a cellular communication channel between a user equipment (UE) and a gNodeB of a cellular network for sending a short message service (SMS) message in response to a cellular service request from the UE;
analyzing an SMS message characteristic of the SMS message; and
determining a duration of time for which the cellular communication channel is to be kept active based on the analyzed SMS message characteristic of the SMS message; and
transmitting a channel maintenance instruction to the gNodeB based on the determined duration of time for which the cellular communication channel is to be kept active.

15. The method of claim 14, further comprising:
transmitting, by the UE, the SMS message via the cellular communication channel; and
sending, by the UE, the SMS message characteristic of use of the UE to the gNodeB.

16. The method of claim 14, further comprising:
receiving, by the gNodeB, the transmitted channel maintenance instruction; and
adjusting, by the gNodeB, a timer based on the determined duration of time for which the cellular communication channel is to be kept active.

17. The method of claim 16, wherein the timer is the T300 timer.

18. The method of claim 14, further comprising:
transmitting, by the UE to the gNodeB, the SMS message characteristic indicating that text is being input to the UE.

* * * * *